United States Patent [19]

Self

[11] 4,347,331

[45] Aug. 31, 1982

[54] FOAMED, LOW DENSITY, HIGHLY EXTENDED UNSATURATED POLYESTER RESIN SYRUP COMPOSITION, A SHAPED ARTICLE COMPRISED OF THE COMPOSITION AND A PROCESS FOR PREPARING SUCH ARTICLE

[75] Inventor: James M. Self, Taylor, S.C.

[73] Assignee: Tanner Chemical Company, Inc., S.C.

[21] Appl. No.: 281,726

[22] Filed: Jul. 9, 1981

Related U.S. Application Data

[63] Continuation-in-part of Ser. No. 191,134, Sep. 26, 1980, abandoned.

[51] Int. Cl.³ .............................................. C08J 9/00
[52] U.S. Cl. .................................. 521/119; 521/83; 521/92; 521/100; 521/123; 521/125; 521/182
[58] Field of Search ............... 521/119, 182, 123, 100, 521/125, 83, 92

[56] References Cited

U.S. PATENT DOCUMENTS

| | | | |
|---|---|---|---|
| 3,373,225 | 3/1968 | Degginger | 525/419 |
| 3,920,589 | 11/1975 | Jacobs et al. | 521/55 |
| 3,951,885 | 4/1976 | Thompson | 521/181 |
| 3,960,583 | 6/1976 | Netting et al. | 521/182 |
| 4,016,112 | 4/1977 | Kojura et al. | 521/107 |
| 4,055,519 | 10/1977 | Thompson | 521/119 |
| 4,059,560 | 11/1977 | Lawson et al. | 260/45.7 R |
| 4,119,583 | 10/1978 | Filip et al. | 521/103 |
| 4,192,791 | 3/1980 | Self | 260/40 R |

Primary Examiner—Morton Foelak
Attorney, Agent, or Firm—Harry B. Keck

[57] ABSTRACT

A foamed, low density, highly extended, polymerized unsaturated polyester resin product which exhibits excellent fire, strength and insulative properties. The product is formed by combining a first component comprised of unsaturated polyester resin syrup, reactive, non-reinforcing, extender material capable of providing a blowing agent nd selected from the group consisting of inorganic carbonate compounds, inorganic bicarbonate compounds and mixtures thereof and, optionally, non-reactive, non-reinforcing extender material with a second component comprised of an aqueous solution of aluminum hydroxie chloride and, optionally, non-reactive, non-reinforcing, extender material. When the two components are combined as a composition mixture, the reactive, non-reinforcing, extender material and the aluminum hydroxie chloride solution react to provide a blowing agent and to form a solid product which chemically binds the water originally present. If desired, a reinforcing filler material can be incorporated into the composition. A wide variety of shaped articles can be formed from the composition.

33 Claims, No Drawings

FOAMED, LOW DENSITY, HIGHLY EXTENDED UNSATURATED POLYESTER RESIN SYRUP COMPOSITION, A SHAPED ARTICLE COMPRISED OF THE COMPOSITION AND A PROCESS FOR PREPARING SUCH ARTICLE

CROSS-REFERENCES TO RELATED APPLICATIONS

This application is a continuation-in-part of my copending application Ser. No. 191,134, filed Sept. 26, 1980, now abandoned.

BACKGROUND OF THE INVENTION

1. Field of the Invention

This invention relates to a foamed, low density, highly extended, polymerized unsaturated polyester resin syrup product and to an unpolymerized composition mixture which cures to a foamed product. This invention also relates to a shaped article comprised of the foamed, low density, highly extended, polymerized unsaturated polyester resin syrup composition and to a process of preparing a shaped article.

2. Description of the Prior Art

It is known in the art that foamed polymeric products may be prepared by incorporating a compound which generates a blowing agent in situ. Thus, for example, U.S. Pat. No. 3,224,983 describes the use of organic carbonates which, when heated, liberate carbon dioxide as a blowing agent for various thermoplastic resins. The temperature at which the carbon dioxide is liberated can be lowered by an activator which may be certain inorganic acids, bases or salts exemplified by sodium carbonate and sodium bicarbonate. Similarly, U.S. Pat. No. 3,470,114 discloses the preparation of foamed saturated polyesters wherein carbon dioxide is generated from an aromatic polycarbonate.

Foamed unsaturated polyester resin syrup products are described in U.S. Pat. No. 3,884,844. To obtain such products, the reaction is conducted under subatmospheric pressure at a range of about 180 to 50 Torr, in the presence of a volatile blowing agent and a nucleating agent. The blowing agent can be any compound which will release gas under the reaction conditions. The patent further states that dispersing agents, surfactants, cell stabilizers, flame retardants, fillers and reinforcing agents may be optionally added to the compositions.

U.S. Pat. No. 4,028,289 relates to a stabilized polyester resin product which is foamed using bicarbonate of soda. The product also contains an inorganic filler in amount ranging up to 80% or more of the weight of the polyester-filler material.

Other patents which disclose a variety of foamed unsaturated polyester resin products include U.S. Pat. Nos. 3,920,589, 4,016,112, 4,028,289, 4,119,583. However, all such known foamed polyester resin products have failed to provide high extension with attendant excellent strength and fire properties. This is due to the large increase in viscosity which typically accompanies the addition of filler material to polyester compositions and which makes handling by conventional apparatus impossible.

In applicant's U.S. Pat. No. 4,192,791, a non-foamed, high density, polymerized unsaturated polyester resin syrup product containing basic aluminum chloride is disclosed. Although high extensions may be obtained, the inherent high density of the composition (i.e., 115–120 lbs/cu ft) constitutes a disadvantage in certain environments. Additionally, unless certain precautions are taken, the composition exhibits a slight shrinkage in volume upon curing which must be considered when the precise dimensions of the shaped article are of importance.

Accordingly, the art has heretofore failed to provide a foamed, low density, highly extended polymerized unsaturated polyester resin syrup product which exhibits excellent strength, fire and insulative properties or a composition or a process whereby such products can be made.

For clarity, the following expressions are employed in this specification and claims.

Composition—refers to the starting ingredients and their relative proportions. The "composition" of this invention is a foamable composition.

Composition mixture—refers to a mixture in which all ingredients of the composition are mixed. The "composition mixture" of this invention is actively foaming.

Component—refers to mixtures of ingredients which are subsequently combined with other "components" to form the composition mixture.

Product—refers to the solid, foamed article which is obtained by the reactions of a composition mixture.

OBJECTS AND SUMMARY OF THE INVENTION

It is therefore an object of the present invention to provide an unsaturated polyester resin syrup composition which eliminates or substantially reduces the problems of the prior art.

It is a more specific object of the present invention to provide a foamed, low density, highly extended, polymerized, unsaturated polyester resin syrup product.

It is another object of the present invention to provide a foamed, low density, highly extended, polymerized, unsaturated polyester resin syrup product which possesses excellent strength, fire and insulative properties.

It is yet another object of the present invention to provide a foamable, low density, highly extended, unsaturated polyester resin syrup composition which does not shrink upon curing.

It is a further object of the present invention to provide a polymerizable composition mixture which cures to a foamed, low density, highly extended, polymerized unsaturated polyester resin syrup product.

It is a still further object of the present invention to provide a shaped article comprised of a foamed, low density, highly extended, polymerized unsaturated polyester resin syrup product.

It is yet a further object of the present invention to provide a process for preparing a shaped article comprised of a foamed, low-density, highly extended, polymerized unsaturated polyester resin syrup product.

These and other objects, as well as the scope, nature, and utilization of the invention will be apparent from the following summary and description of the preferred embodiments of the present invention.

In one aspect, the present invention relates to a foamed, low density, highly extended, polymerized unsaturated polyester resin syrup product comprising:

(a) polymerized unsaturated polyester resin syrup; and (b) the reaction product of aqueous aluminum hydroxie chloride solution and reactive, non-reinforcing, extender material capable of providing a blowing agent which is selected from the group consisting of inorganic carbonate compounds, inorganic bicarbonate compounds and mixtures thereof,
wherein the original weight ratio of the sum of the reactive, non-reinforcing, extender material and the aqueous aluminum hydroxie chloride solution to the unsaturated polyester resin syrup is from about 0.5:1.0 to about 10.0:1.0 and the original weight ratio of the reactive, non-reinforcing, extender material to the aqueous aluminum hydroxie chloride solution is less than about 5.0:1.0.

In another aspect, the present invention relates to a shaped article comprised of a foamed, low density, highly extended, polymerized unsaturated polyester resin syrup product having defined components.

In a further aspect, the present invention relates to a highly extended, polymerizable unsaturated polyester resin syrup composition mixture capable of forming a foamed, low density, highly extended polymerized unsaturated polyester resin syrup product, said composition mixture comprising:

(a) unsaturated polyester resin syrup;
(b) aqueous aluminum hydroxie chloride solution; and
(c) reactive, non-reinforcing, extender material capable of providing a blowing agent which is selected from the group consisting of inorganic carbonate compounds, inorganic bicarbonate compounds and mixtures thereof, wherein the original weight ratio of the sum of the reactive, non-reinforcing, extender material and the aqueous aluminum hydroxie chloride solution to the unsaturated polyester resin syrup is from about 0.5:1.0 to about 10.0:1.0 and the original weight ratio of the reactive, non-reinforcing, extender material to the aqueous aluminum hydroxie chloride solution is less than about 5.0:1.0.

In still a further aspect, the present invention relates to a highly extended, unpolymerized unsaturated polyester resin syrup composition mixture capable of forming a foamed, low density, highly extended, polymerized unsaturated polyester resin syrup product, said composition mixture comprising:

(a) from about 12 to about 33 parts by weight of unsaturated polyester resin syrup;
(b) from about 4 to about 30 parts by weight of aqueous aluminum hydroxie chloride solution; and
(c) from about 15 to about 50 parts by weight of reactive, non-reinforcing, extender material capable of providing a blowing agent which is selected from the group consisting of inorganic carbonate compounds, inorganic bicarbonate compounds and mixtures thereof.

In yet a further aspect, the present invention relates to a process for preparing a shaped article comprising:

(a) preparing a first component comprising
  (i) unsaturated polyester resin syrup, and
  (ii) reactive, non-reinforcing, extender material capable of providing a blowing agent which is selected from the group consisting of inorganic carbonate compounds, inorganic bicarbonate compounds and mixtures thereof;
(b) preparing a second component comprising
  (i) an aqueous solution containing from about 25 to about 65%, by weight, of aluminum hydroxie chloride,
(c) mixing the first and second components to form a composition mixture;
(d) shaping the composition mixture into the configuration of the article; and
(e) curing the composition mixture to form a foamed, low density, highly extended, polymerized unsaturated polyester resin syrup product, wherein the composition mixture has an original weight ratio of the sum of the reactive, non-reinforcing, extender material and the aqueous aluminum hydroxie chloride solution to the unsaturated polyester resin syrup of from about 0.5:1.0 to about 10.0:1.0 and an original weight ratio of the reactive, non-reinforcing, extender material to the aqueous aluminum hydroxie chloride solution of less than about 5.0:1.0.

CONTINUATION-IN-PART

In the parent patent application Ser. No. 191,134 supra, the foamable compositions were defined inadvertently throughout as having a weight ratio of the sum of (i) the reactive, non-reinforcing, extender material, (ii) the non-reactive, non-reinforcing, extender material, if any, and (iii) the aqueous aluminum hydroxie chloride solution to the unsaturated polyester resin syrup from about 2.0:1.0 to 10.0:1.0. That ratio should have been 1.0:2.0 to 10.0:1.0. The unintended error is corrected in this continuation-in-part application. The 1.0:2.0 ratio is expressed herein as its equivalent, 0.5:1.0. This continuation-in-part application also discloses a novel and useful two-component foamable composition which includes as one component: polymerizable unsaturated polyester resin syrup and finely divided reactive non-reinforcing extender; and as the other component: aqueous aluminum hydroxie chloride, surfactant, and finely divided non-reactive, non-reinforcing extender. The two component composition can be prepared and stored or shipped and stored for extended periods of time. This continuation-in-part application further employs the defined expressions "product", "composition", "composition mixture" and "component" to avoid ambiguities. Certain proportions were expressed incorrectly in the parent application as "% by weight" when "parts by weight" was intended. These items are correctly expressed in this continuation-in-part application.

DESCRIPTION OF PREFERRED EMBODIMENTS

As stated above, one aspect of the present invention relates to a foamed, low density, highly extended, polymerized unsaturated polyester resin syrup product. The products may be employed wherever unsaturated polyester resin products are utilized. These utilities include the preparation of shaped articles such as coatings, furniture, toys, plumbing fixtures, duct work, automotive and truck body parts, boats, electrical component housings, electrical circuit boards, decorative items, appointments, storage tanks, swimming pools and a variety of other products. One preferred utility is in the preparation of construction materials, such as shaped building panels, fire walls or fire doors, which exhibit excellent strength, fire and insulative properties. As used in the present specification, the term "shaped" describes an article which may be prepared by techniques which are generally utilized in this art. Thus, for example, this term encompasses articles which are prepared by spraying, molding, pressing, casting, hand lay-up, extruding, rolling, etc.

A preferred utility involves spray-up processes wherein the present foamable compositions in a foaming condition, are sprayed onto a stream of chopped glass fiber strands to create a layer of rigid, lightweight glass-fiber reinforced product which has particular utility in plumbing products such as bath-tubs, shower-cabinets, swimming pools and other tubs or containers.

The foamed, low density, highly extended, polymerized unsaturated polyester resin syrup product is prepared from unsaturated polyester resin syrup, aluminum hydroxie chloride and reactive, non-reinforcing, extender material. The foamable composition may also include non-reactive, non-reinforcing, extender material. The amounts of the components are selected such that the original weight ratio of the sum of (i) the reactive, non-reinforcing, extender material, (ii) the non-reactive, non-reinforcing, extender material, if any, and (iii) the aqueous aluminum hydroxie chloride solution to the unsaturated polyester resin syrup is from about 0.5:1.0 to about 10.0:1.0, preferably from about 0.5:1.0 to about 5.0:1.0, and the original weight ratio of the sum of the reactive, non-reinforcing, extender material and the non-reactive, non-reinforcing, extender material, if any, to the aqueous aluminum hydroxie chloride solution is less than about 5.0:1.0, preferably from about 3.0:1.0 to about 1.0:1.0. As used in the present specification, the term "original" is used to reflect the starting materials which exist prior to the reaction which is believed to occur between the reactive, non-reinforcing, extender material and the aqueous aluminum hydroxie chloride solution. Thus, the weight ratios are determined on the basis of the amounts of the reactive, non-reinforcing, extender material and aqueous aluminum hydroxie chloride solution originally used in the unreacted composition mixtures. As more fully explained below, the water which is originally present in the aqueous aluminum hydroxie chloride solution is chemically bound during the reaction and hence is included in the determination of the weight ratios.

The unsaturated polyester resin syrup which is used in the composition of the present invention includes an unsaturated polyester resin with a copolymerizable monomer which contains a terminal vinyl group. Such unsaturated polyester resin syrups are widely available commercially. The unsaturated polyester resin is generally derived from the polyesterification of a polycarboxylic acid or a polycarboxylic acid anhydride with a polyol, customarily a glycol, in a manner known to those of ordinary skill in the art. To obtain ethylenic unsaturation, the polycarboxylic acid (or acid anhydride), the polyol, or both, must contain at least one ethylenically unsaturated double bond in the structure.

Typical of the polycarboxylic acids and acid anhydrides which may be used in the present invention are phthalic acid or anhydride, isophthalic acid, terephthalic acid, adipic acid or anhydride, succinic acid or anhydride, tetrahydrophthalic acid or anhydride, tetrabromophthalic acid or anhydride, maleic acid or anhydride, fumaric acid and combinations thereof.

Typically polyols which are used in the preparation of the unsaturated polyester resin are ethylene glycol, propylene glycol, butylene glycol, neopentyl glycol, diethylene glycol, dipropylene glycol, polyethylene glycol, polypropylene glycol, trimethylol ethane, trimethylol propane, pentaerythritol, hydroxy-alkyl esters of polycarboxylic acids, and combinations thereof. As is well known to those skilled in the art, a slight stoichiometric excess of polyol is generally employed in the preparation of the unsaturated polyester resin to facilitate the reaction between the polycarboxylic acid (or anhydride) and the polyol and to reduce the viscosity of the formed polyester resin.

As stated above, the copolymerizable monomer, which is combined with the unsaturated polyester resin to form the liquid resin syrup, contains a terminal vinyl group. When reacted, the unsaturated polyester resin and the copolymerizable monomer produce a polymer structure which is cross-linked. Exemplary of such monomers are styrene, alpha-methyl styrene, o-chlorostyrene, vinyl toluene, acrylic acid, methacrylic acid, alkyl acrylates, alkyl methacrylates, divinyl benzene, diacrylates, dimethacrylates, triacrylates, trimethacrylates and combinations thereof. In general, the monomer is provided in an amount which constitutes from about 20 to about 40% of the total weight of the resin syrup.

A further type of acceptable copolymerizable monomer is the reaction product of a polyepoxide with acrylic or methacrylic acid, as described in U.S. Pat. Nos. 3,373,075 and 3,301,743, the contents of which are incorporated by reference in the interest of brevity. Similar monomers may be prepared by reacting a polyol such as 2,2-bis(4-hydroxyphenyl) propane, i.e., bisphenol A, with glycidyl acrylate or glycidyl methacrylate. This type of copolymerizable monomer may be employed as a partial replacement for a portion of the unsaturated polyester resin in the preparation of the resin syrup.

Further examples of acceptable polycarboxylic acids or anhydrides, polyols and copolymerizable monomers are set forth in U.S. Pat. No. 4,041,008, the content of which is incorporated by reference in the interest of brevity.

The aluminum hydroxie chloride, which is employed in the unsaturated polyester resin syrup composition of the present invention, defines a compound having the general formula:

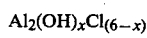

$$Al_2(OH)_xCl_{(6-x)}$$

wherein x is 0 to 5, preferably 1 to 5.

It has been found that where x is 6, aluminum hydroxide results, which does not possess the ability of the defined aluminum hydroxie chloride of being able to form the foamed, low density, highly extended, polymerized unsaturated polyester resin syrup composition of the present invention. Where x is 0, aluminum chloride results which, though operable, presents handling difficulties that detract from its usefulness to a certain degree. For example, the high level of acidity of the compound tends to accelerate the reaction and thereby shortens the working life of the composition mixture. From the foregoing discussion, it should be clear to those of ordinary skill in the art that the value of x may be selected so as to regulate the acidity and hence in part to regulate the amount and rate of foaming. Thus, where the aluminum hydroxie chloride is prepared such that x is a lower number (e.g., 1 or 2), a faster rate of foaming and a larger amount of foaming can generally be expected compared to those instances where the aluminum hydroxie chloride is prepared such that x is a higher number (e.g., 4 or 5).

The aluminum hydroxie chloride is employed as an aqueous mixture containing from about 25 to about 65%, preferably from about 40 to about 55%, by weight, of solid aluminum hydroxie chloride. Since the aluminum hydroxie chloride solution is not usually formed by merely adding water to the anhydrous compound, but rather by reacting all the necessary components, the indicated percentages of water present in the solution are determined on a stoichiometrically calculated basis. That is, the percentage of water in the final solution is determined by calculating the amount of water used in the reaction mixture with respect to the other reactants. One acceptable aqueous mixture is prepared by combining from about 5 to about 20 parts, preferably from about 8 to about 15 parts, by weight of aluminum chloride with from about 95 to about 80 parts, preferably from about 92 to about 85 parts, by weight of an aqueous solution containing about 50%, by weight, of $Al_2(OH)_5Cl.yH_2O$ (the 50% solution is available from Wickhen Products, Inc. of Huguenot, N.Y., under the trademark Wickenol 308).

Another technique of preparing an aqueous mixture or solution of aluminum hydroxie chloride is by the electrolysis of aluminum chloride. This technique is discussed in detail in U.S. Pat. No. 3,113,911, the content of which is incorporated by reference in the interest of brevity. Other techniques known to those of ordinary skill in the art may be similarly employed to prepare the aqueous solution of aluminum hydroxie chloride.

The reactive extender material, which is the third component of the composition mixture of the present invention, is generally non-reinforcing in nature in that it typically does not greatly contribute to the overall strength of the composition. While this extender material is substantially non-reactive with regard to the unsaturated polyester resin syrup, it reacts with the aqueous aluminum hydroxie chloride solution to form a solid inorganic substance and to provide the blowing agent necessary for the formation of the foamed, low density, highly extended, polymerized unsaturated polyester resin syrup product. The reactive, non-reinforcing, extender material may be naturally occurring or synthetic and is typically an inorganic carbonate compound, inorganic bicarbonate compound or a mixture thereof which is generally in particulate form. The reactive, non-reinforcing, extender material is preferably a carbonate compound of a Group IA metal, a carbonate compound of a Group IIA metal, a bicarbonate compound of a Group IA metal, a bicarbonate compound of a Group IIA metal or a mixture thereof. Exemplary reactive, non-reinforcing, extender materials include dolomite, aragonite, azurite, calcite, cerussite, magnesite, siderite, smithsonite, marble, limestone, lead carbonate, lead bicarbonate, nickel carbonate, nickel bicarbonate, zinc carbonate, zinc bicarbonate, aluminum carbonate, aluminum bicarbonate, preferably include potassium carbonate, potassium bicarbonate, sodium carbonate, sodium bicarbonate, magnesium carbonate, magnesium bicarbonate, calcium bicarbonate and most preferably is calcium carbonate.

In addition to falling within the defined ranges of the overall composition or composition mixture, it is preferably to employ at least as much of the reactive, non-reinforcing, extender material necessary to neutralize completely the aluminum hydroxie chloride. This ensures a fully foamed, stable product. The precise amount of reactive extender employed will naturally vary depending on the type and amount of aluminum hydroxie chloride employed. However, in all instances, it may be determined on a stoichiometric basis and/or by experimentation in a manner well known to those of ordinary skill in the art.

As previously stated, the composition mixture may optionally include a non-reactive, non-reinforcing, extender material. This material may be omitted when the foamed, low density, highly extended, polymerized unsaturated polyester resin product is to be placed in those environments where fire is of less concern. Such environments are exemplified by underground storage tanks and swimming pools. On the other hand, where fire constitutes an omnipresent danger, the non-reactive, non-reinforcing, extender material is generally incorporated into the composition mixture to reduce the organics content thereof. As used herein, the terms "non-reactive" and "non-reinforcing" are used to define extender materials which do not substantially adversely affect either curing or cross-linking of the resin syrup or the reaction between the reactive extender material and the aqueous aluminum hydroxie chloride solution and which do not greatly contribute to the overall strength of the product. The non-reactive, non-reinforcing, extender materials are generally particulate in nature and include refractory aggregates, ground glass, glass microspheres, silica, magnesium oxide, mullite, fly ash, zirconia, clays, bentonite, kaolin, attapulgite, titanium dioxide, antimony oxide, pigments, low density insulating materials such as perlite or expanded vermiculite, plaster of Paris, and combinations thereof. The particular extender material employed is generally dependent on the desired properties of the product. For example, one preferred extender material is aluminum trihydrate ($Al(OH)_3$)) which imparts excellent fire properties to the composition. One type of acceptable aluminum trihydrate is available from Solem Industries, Inc., of Atlanta, Georgia under the name SB-332.

In preparing an unsaturated polyester resin syrup composition which has a higher degree of extension (e.g., from about 5.5:1.0 to about 10.0:1.0, reactive and non-reactive extender materials and aqueous aluminum hydroxie chloride solution to resin syrup), the particle size distribution of the non-reactive extender material may be selected so as to reduce the viscosity of the composition mixture. In particular, by employing a certain distribution of particle sizes, larger amounts of extender material may be added to the composition mixture, without increasing the viscosity beyond the capabilities of conventional handling apparatus. Of course, the distribution of particle sizes may also be used to reduce the viscosity of composition mixtures having extensions of less than about 5.5:1.0. An additional advantage of the lower viscosity is that it will enable various additives to be readily incorporated into the composition mixture.

While the precise reasons for this phenomenon are not completely understood, it is believed that the smaller particles will fit into the interstices formed by the larger particles thereby enabling higher extensions to be obtained. The continuous liquid phase serves to maintain the viscosity of the mixture within workable limits. It is to be understood however, that applicant does not intend to be bound by this theory.

Less extended compositions also are particularly useful for the same end uses, although the costs of such less extended compositions may be greater. The less extended compositions include composition mixtures with mix ratios of 0.5:1.0 to 2.0:1.0 (non-reactive extender plus reactive extender plus aqueous aluminum hydroxie chloride to unsaturated polyester resin syrup). Such less extended compositions can be prepared from two stable, storageable components without requiring special mixing equipment. One component (COMPONENT A) includes:
(i) unsaturated polyester resin syrup;
(ii) reactive, non-reinforcing extender, having a particle size less than about 10 microns;
and the other component (COMPONENT B) includes:
(i) aqueous aluminum hydroxie chloride;
(ii) non-reactive, non-reinforcing extender having a particle size of less than about 10 microns;
(iii) surfactant; and
(iv) stable catalyst for the polymerization of the unsaturated polyester resin syrup.

By mixing COMPONENT A and COMPONENT B in suitable proportion, a useful foamed product can be obtained from a blending nozzle which draws and mixes separate, controlled flow-rate streams of COMPONENT A and COMPONENT B. In a preferred embodiment, the blending nozzle impinges its spray of mixture onto a descending cloud of chopped glass fiber strands and the wetted glass fibers are collected on a spray-up mold surface. In this embodiment, lightweight, foamed glass-fiber reinforced products can be obtained. No rollout of the mixture against the molding surface is required.

The small particle size extender materials in COMPONENT A and in COMPONENT B achieves the desired stability of the components for storage and shipment. If larger particles sizes are employed, the components tend to harden in storage.

The specific particle size distribution of the non-reactive extender material required to obtain a composition mixture possessing a reduced viscosity varies according to the polyester resin syrup and the type and nature (i.e., the manner of preparation) of the extender material. In all situations, however, the lowest possible viscosity due to the particle size distribution may be determined by those of ordinary skill in the art by routine experimentation. Thus, for example, an extender material containing from about 55–70% by weight of SB-332 (aluminum trihydrate which is characterized by 99.5% of the particles passing through a 325 mesh sieve) and correspondingly 45–30% by weight of aluminum trihydrate available from the Aluminum Company of America as C-31 (which is characterized by 0–1% of the particles being retained on a 100 mesh sieve, 5–10% of the particles being retained on a 200 mesh sieve, 30–65% of the particles being retained on a 325 mesh sieve) yields a composition mixture having a lower viscosity than that mixture containing an identical amount of only SB-332.

In those situations where structural strength is an important consideration, such as in the preparation of building panels, from about 5 to about 25%, based on the total weight of the composition, of a reinforcing filler material may be included in the composition. As used in the present specification, the term "total weight" refers to the total of the weight of the resin syrup, the weight of the aqueous aluminum hydroxide chloride solution, the weight of the reactive and non-reactive extender materials and the weight of the reinforcing filler material. The reinforcing filler material typically has a fibrous consistency and may include glass fibers, asbestos fibers, cellulosic fibers, graphite fibers, plastic fibers, metal fibers, mineral wool, expanded metal lath, etc., and combinations thereof. Glass fibers are especially preferred due to their excellent fire properties, strength, availability and low cost.

To obtain the foamed, low density, highly extended, polymerized unsaturated polyester resin syrup products, it has been found that it is necessary to combine the ingredients of the composition via a particular process. If this process is not followed, the initial viscosity of the composition mixture, (i.e., the viscosity within about 1 minute after mixing all the ingredients) increases to the extent that handling the composition mixture with conventional mixing and shaping apparatus is no longer possible. In general, a workable composition mixture has an initial viscosity of less than about 100,000 centipoise, preferably less than about 25,000 centipoise and most preferably less than about 10,000 centipoise, when measured with a Brookfield mode RVT Viscometer with a No. 5 Spindle at 20 RPM. It is to be understood, however, that higher viscosities may be utilized if specialized equipment is employed.

Specifically, the process involves the preparation of a first component comprising unsaturated polyester resin syrup, reactive, non-reinforcing, extender material and, optionally, non-reactive, non-reinforcing extender material and a second component comprising aqueous aluminum hydroxie chloride solution and, if present, non-reactive, non-reinforcing, extender material. In general, the first and second components are formed immediately before they are mixed together, however, premixed first and second components may also be used. The first and second components are then mixed together in any conventional mixing apparatus for about 1 to about 60 seconds to form a generally thixotropic composition mixture, which is shaped into the configuration of the desired article and allowed to foam and cure. In mixing the first and second components, it is important that a substantially homogeneous mixture be obtained to enable the composition mixture to cure into the thermoset, cured, cross-linked, foamed, low density, highly extended, polymerized unsaturated polyester resin syrup product of the present invention having maximum strength characteristics.

While additional components containing additional quantities of resin syrup, aluminum hydroxie chloride solution and either of the extender materials may be employed in the process, in the interest of brevity and clarity, the process has been described with two components. It is to be understood, however, that the present invention encompasses those situations in which more than two components are employed.

Prior to any reaction between the reactive, non-reinforcing, extender material and the aqueous aluminum hydroxie chloride solution, the composition mixture typically comprises from about 12 to about 33 parts by weight, of unsaturated polyester resin syrup, from about 4 to about 30 parts by weight, of aqueous aluminum hydroxie chloride solution, from about 15 to about 50 parts by weight of non-reactive, non-reinforcing, extender material.

In a preferred aspect of the invention, the composition mixture comprises from about 15 to about 30 parts by weight of unsaturated polyester resin syrup, from about 5 to about 15 parts by weight of aqueous aluminum hydroxie chloride solution, from about 20 to about 50 parts by weight of reactive, non-reinforcing, extender material and, if present, from about 20 to about 50 parts by weight of non-reactive, non-reinforcing, extender material.

Where reinforcing filler material is desired, the material may be added to either of the individual components before they are mixed, added during the mixing of the components or, preferably, added after the components have been mixed to form the composition mixture.

When the components are combined to form the composition mixture, the reactive, non-reinforcing, extender material and the aqueous aluminum hydroxie chloride solution react to form complex solid reaction products of the aluminum hydroxie chloride and the reactive, non-reinforcing extender. The reaction also provides the blowing agent necessary for forming the foamed composition. This reaction causes the viscosity of the composition mixture to increase along with the volume thereof. An important aspect of the reaction is that the solid reaction products bind water which is originally present in the composition mixture which in part obviates the shrinkage noted in applicant's U.S. Pat. No. 4,192,791, the content of which is incorporated by reference in the interest of brevity. Additionally, the bound water serves to improve the fire properties of the foamed composition. Although the precise mechanism by which this occurs and the reaction products themselves are not fully understood, applicant has theorized the following exemplary reaction:

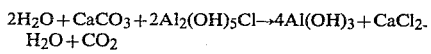
$$2H_2O + CaCO_3 + 2Al_2(OH)_5Cl \rightarrow 4Al(OH)_3 + CaCl_2 \cdot H_2O + CO_2$$

By this reaction, it may be seen that water is bound during the formation of aluminum trihydrate and the chloride salt. However, it is to be understood that applicant is not to be held to the above reaction since it is theoretical in nature and does not take into consideration other reaction products which may be formed, e.g., complex co-salts such as:

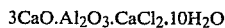
$$3CaO \cdot Al_2O_3 \cdot CaCl_2 \cdot 10H_2O$$

The working life of the composition mixture (i.e., the time, after mixing the components, during which the composition mixture may be shaped into the desired configuration) may vary depending on numerous factors including ambient temperature, the type and amount of resin syrup, the type and amount of aluminum hydroxie chloride solution, the type and amount of reactive and non-reactive extender material and reinforcing material, and the type and amount of other additives, especially the accelerator, which are described below. Typically, the working life ranges from about 2 minutes to about 30 minutes. Based on similar considerations, the time necessary to cure the resin syrup in the composition mixture may range from about 5 minutes to about 2 hours. When structural strength is a consideration, the cured, cross-linked, foamed, low density, highly extended, polymerized unsaturated polyester resin syrup product of the present invention is typically allowed to "set", wherein substantially complete polymerization and cross-linking is obtained, for about 2 days to about 7 days after curing, before being utilized.

During the time that the constituents of the composition mixture are interacting, the foaming composition mixture undergoes a two to three-fold increase in volume with an attendant substantial decrease in density. Thus, to form a shaped article, the composition mixture is typically placed on a form or in a mold and permitted to expand to form a cured, cross-linked, foamed, highly extended, polymerized unsaturated polyester resin syrup product which typically exhibits a density in the range of from about 5 to about 90 lbs/cu ft, preferably from about 30 to about 50 lbs/cu ft.

One advantage of using plaster of Paris as a non-reactive, extender material is that by varying the setting time of the plaster of Paris with respect to the foaming and curing of the resin syrup composition mixture, the structural characteristics of the product may be altered. For example, if the plaster of Paris is allowed to set before the resin syrup cures, a relatively inflexible product results. On the other hand, if the plaster of Paris is allowed to set after the resin syrup cures, a relatively flexible product is obtained. To obtain these structural characteristics, the cure time of the resin syrup may be regulated by selecting the appropriate type and amount of initiator and/or accelerator. Similarly, the setting time of the plaster of Paris may be retarded by either selecting a more acidic solution of aluminum hydroxie chloride or more preferably, by adding small amounts of an acidic material, such as an aluminum sulfate solution, to the component containing the plaster of Paris. In this regard, it has been found that the aluminum sulfate solution provides an additional advantage in that it reduces the viscosity of the component containing the plaster of Paris which in turn reduces the viscosity of the overall composition mixture.

A further important aspect of the process is that the viscosity of the individual components must be maintained at a level so that they may be mixed together to form a workable composition mixture. In particular, the viscosity of one component and, preferably both components, is generally less than about 20,000 centipoise, preferably less than about 10,000 centipoise, when measured by the above-described viscometer, spindle and rotational speed. It is understood, however, that the viscosity of the overall composition mixture is a more important consideration since it is the composition mixture which will be employed to form the shaped article.

The viscosity of the individual components is primarily dependent on the amount of extender material in the component compared to the amount of resin syrup or aluminum hydroxie chloride solution present. Thus, in the first component, the weight ratio of the sum of reactive, non-reinforcing, extender material and any non-reactive, non-reinforcing extender material to resin syrup is generally less than about 2.0:1.0 and preferably from about 1.5:1.0 to about 0.5:1.0. In the second component, the weight ratio of non-reactive, non-reinforcing extender material if present, to aluminum hydroxie chloride solution is generally less than about 3.0:1.0 and preferably from about 2.0:1.0 to about 1.0:1.0. Preferably, the total amount of non-reactive, non-reinforcing, extender material employed is divided between the first and second components such that the components and the composition mixture are workable (i.e., capable of being handled by conventional mixing and shaping apparatus). Although the precise acceptable proportions of extender material in the components will vary according to the ingredients used, as may readily be determined by routine experimentation, it is preferred that the non-reactive extender material be divided such that the viscosity of each component is approximately equal. Thus, for example, the first component may be comprised of about 50% unsaturated polyester resin syrup, about 35% non-reactive extender material and about 15% reactive extender material while the second component may be comprised of about 50% aluminum hydroxie chloride solution and 50% non-reactive extender material. All percentages are on a weight basis.

In addition to the unsaturated polyester resin syrup, aqueous aluminum hydroxie chloride solution and reactive and non-reactive extender materials, the components may include conventional additives such as initiators, accelerators, surfactants, fire retardants, etc. in amounts well known to those of ordinary skill in the art. Additionally, small amounts (e.g., from about 5 to about 10% by weight of the aluminum hydroxie chloride solution) of compatible acids and acid salts, such as sulfuric acid, hydrochloric acid, acetic acid and mixtures thereof may be employed to increase the amount and rate of foaming.

Typical initiators for the unsaturated polyester resin syrup include peroxy compounds such as benzoyl peroxide, cumene hydroperoxide, tertiary butyl peroxide and the like. A particularly useful peroxy initiator for room temperature curing is 2,5-dimethyl hexane-2,5-dimethyl-diper-2-ethyl hexoate. The peroxy initiators customarily are provided in the form of pastes in which the peroxy material is dispersed in a glycol. Accelerators for the peroxy initiators include, amines, cobalt naphthenate and cobalt octoate.

Surfactants may also be incorporated into either of the components. The surfactants, which are added to obtain a smoother consistency and a composition mixture having a slightly reduced viscosity, include the non-ionic, ethoxylated triglycerides which are available from Emery Chemical Company under the names Trylox CO-30 or Trylox CO-200/50. A further advantage of using a surfactant is in those situations where a press-molded article is desired and there is less than 5% by weight of plaster of Paris in the composition mixture. In these instances, the surfactant serves to help prevent the tendency of the resin syrup to separate from the inorganic ingredients around the edges of the mold when the composition mixture is press molded. However, in all situations, the use of a surfactant tends to slightly reduce the strength characteristics of the foamed and cured article.

It is generally preferably to incorporate the additives into one or both of the individual components before they are mixed together. For example, while a surfactant may be added to either or both of the components, it is preferably to add a surfactant to the component containing the resin syrup. Similarly, it is generally desirable to add an initiator to the component containing the resin syrup, while adding an accelerator to the component containing the aluminum hydroxie chloride. However, where lower viscosity composition mixtures are obtained, (e.g., by using extender material that has the viscosity reducing particle size distribution) the initiator and accelerator may be added to the composition mixture immediately before the composition mixture is shaped. To avoid premature foaming, any acidic additives are logically combined with the component containing the solution of aluminum hydroxie chloride.

The individual components are separately mixed so that they each form a substantially homogeneous blend of ingredients wherein the particles of the respective extender materials are wet with the liquid phase of the respective components. Although the mixing time may vary according to numerous factors such as the type of mixing device used, the relative amounts of ingredients, ambient conditions, etc., it generally is in the range of from about 5 to about 30 minutes.

The cured, cross-linked, foamed, low density, highly extended, polymerized unsaturated polyester resin syrup product of the present invention possesses excellent structural strength, fire and insulative properties, particularly where glass fibers are incorporated into the composition mixture. When exposed to fire, the product resists burning due to its low fuel (resin syrup) content. In this regard, it will be noted that the presence of chemically bound water additionally benefits the product in further reducing the proportionate amount of resin syrup in the product and by being capable of being released when exposed to heat. Even when burning occurs, the smoke level is low and the structural integrity of the product is maintained. This creates a continuous region of non-combustible material which protects any material behind it from burning. In those embodiments of the present invention wherein the extender material includes aluminum trihydrate, the cured product will exhibit further improved fire properties due to the ability of aluminum trihydrate to release fire and smoke suppressing water vapor as it is heated.

Improvements in fire properties may also be obtained by employing an unsaturated polyester resin syrup which in itself possesses good fire properties or by incorporating known fire retardant additives in the product. For example, a fire resistant polyester resin syrup may be obtained by preparing the polyester resin from a polyol or polycarboxylic acid or anhydride having a high halogen content such as hexachloro-endomethylene tetrahydrophthalic anhydride or tetrabromophthalic anhydride. A complete discussion of conventional methods of imparting good fire properties to polyesters, which is applicable to the product of the present invention, may be found in an article by C. W. Roberts in Society of Plastic Engineers Transactions, Vol. 3, No. 2, pp. 111–116, April 1963, the content of which is incorporated by reference to the interest of brevity.

The cured, cross-linked, foamed, low density, highly extended, polymerized unsaturated polyester resin syrup product possesses several significant advantages over non-foamed, high density products. In particular, while the foamed product of the present invention typically possesses a lower flexural and tensile strength (albeit still suitable for all of the stated utilities), it possesses a higher flexural modulus. Additionally, the foamed product exhibits a significantly lower thermal conductivity when compared to an unfoamed product which, of course, enhances its insulative characteristics. In fact, the thermal conductivity of the foamed product may approach that of glass fibers which are typically used in batt form to insulate buildings.

Due to the lower density and availability of higher extensions, the foamed product possesses a substantially lower organics content particularly when considered on a volume basis. In this regard, the low density and high strength characteristics of the product reduce transportation costs of products and permit reduced weight vehicles when the products are automotive or truck bodies and structures used on aircraft and ships. The substantial difference in density also permits lighter weight supporting structures to be employed.

In a preferred embodiment of the present invention, a building panel possessing excellent strength, fire and insulative properties may be obtained. In this embodiment, the first component comprises a homogeneous blend of unsaturated polyester resin syrup, aluminum trihydrate, calcium carbonate and, preferbly, a surfactant and an initiator, while the second component comprises a homogeneous blend of aqueous aluminum hydroxie chloride solution, aluminum trihydrate and, preferably, an accelerator. The two components are mixed together to form the composition mixture which is then mixed with reinforcing filler material, preferably, glass fibers. The resulting composition mixture is then shaped into the desired configuration and allowed to foam, cure and set.

A further understanding of the present invention may be obtained with reference to the following Examples. It is to be understood, however, that the invention is not limited to the embodiments described therein.

EXAMPLE I

This example compares the strength and fire properties, the densities and the thermal conductivities or (A) an unfoamed unsaturated polyester resin syrup product; and (B) a foamed unsaturated polyester resin syrup product within the scope of the present invention.

(A) Component 1

An unsaturated polyester resin syrup is prepared by combining 25 parts, by weight, of styrene and 75 parts, by weight, of an unsaturated polyester resin. The polyester resin is obtained by reacting 60 moles of phthalic anhydride, 40 moles of maleic anhydride and 106 moles of propylene glycol.

500 Grams of the above unsaturated polyester resin syrup is mixed with 500 grams of aluminum trihydrate (SB-322), 30 grams of 55% active BPO paste (a 55% by weight solution of benzoyl peroxide in plasticizer which is available from Noury Chemical Compay under the name BSP-55), 10 grams of Trylox CO-30 and 10 grams of Trylox CO 200/50 to give a homogeneous blend.

Component 2

250 Grams of a 50% aqueous basic aluminum chloride solution (Wickenol 308) is mised with 250 grams of aluminum trihydrate (SB 332) and 2 grams of phenylethylethanolamine (an accelerator available from Eastern Chemical Company) to give a homogeneous blend.

Components 1 and 2 are mixed together to give a homogeneous mixture which is poured onto a continuous strand glass mat having the dimensions 20 inches×20 inches, 2 oz. per sq ft. The mixture cures in 15 to 20 minutes. The resulting panel approximately ¼ inch thick, is allowed to set for 7 days at laboratory (i.e. ambient) conditions and is labeled panel I.

(B) Component I

500 Grams of the unsaturated polyester resin syrup described in (A) is mixed with 500 grams of −325 mesh calcium carbonate (marble dust), 40 grams of 40% active BPO fluid (a 40% by weight solution of benzoyl peroxide in plasticizer and is available from Noury Chemical Co. under the name CADOX 40 E), 10 grams of Trylox CO-30 and 10 grams of Trylox CO 200/50 to give a homogenous blend.

Component II

225 Grams of a 50% aqueous basic aluminum chloride solution (Wickenol 308) is mixed with 25 grams of a 32 degree Baume aluminum chloride solution to form the aqueous aluminum hydroxie chloride solution and the resulting mixture is combined with 250 grams of aluminum trihydrate (SB 332) and 2 grams of phenylethylethanolamine to give a homogeneous blend.

Components 1 and 2 are mixed together to give a homogeneous mixture which is poured onto a continuous strand glass mat having the dimensions 20 inches×20 inches, 2 oz. per sq ft. The mixture foams and cures in 15 to 20 minutes. The resulting panel (approximately ¼ inches thick) is allowed to set for 7 days at laboratory (i.e. ambient) conditions and is labeled panel II.

The structural strength and properties of the panels are determined by ASTM D 790 and are as follows:

|  | Panel I | Panel II |
|---|---|---|
| Flexural Strength ($\times$ 10$^3$ psi) | 12.46 | .341 |
| Flexural Modulus ($\times$ 10$^6$ psi) | .74 | 1.196 |
| Tensile Strength ($\times$ 10$^3$ psi) | 6.86 | .09 |
| Tensile Modulus ($\times$ 10$^6$ psi) | .81 | .018 |
| Compressive Strength ($\times$ 10$^3$ psi) | 6.76 | .853 |
| Thermal Conductivity $\frac{(BTU. in.)}{Hr. sq ft F}$ | 1.2–1.3 | .26* |
| Density (g/cm3) | 1.7 | .637 |

*Glass fibers possess a thermal conductivity of about .25.

To test the fire properties of the panels, 6 inch by 6 inch samples are mounted with a clamp at a 45 degree angle. The tip of a one inch flame from a propane torch is impinged on the center of each sample. During the test period, white and light gray smoke and a small amount of orange flame issues from the samples. After one hour the test is discontinued. An oval region approximately 3.2 inches in diameter is burned on each sample. The remaining material is continuous and intact with little or no surface erosion. Panel I and Panel II are thus shown to have essentially the same fire characteristics.

Examples II to VII illustrate other embodiments of the foamed polymerized unsaturated polyester resin syrup product of the present invention. Each of the described embodiments exhibits characteristics similar to those set forth above.

EXAMPLE II

50 Grams of the unsaturated polyester resin syrup described in Example I is combined with 50 grams of calcium carbonate (minus 325 mesh U.S. standard screen), and 0.5 gram benzoyl peroxide powder to form component 1. 50 grams of a 50% by weight aluminum hydroxie chloride solution is combined with 50 grams of aluminum trihydrate (minus 325 mesh U.S. standard screen) to form component 2. When the aluminum trihydrate is mixed with the aluminum hydroxie chloride solution, a slip is formed having a viscosity in the range of 70 to 6,000 cps Brookfield. Components 1 and 2 are stirred in a beaker to form a homogeneous blend and poured onto a plastic sheet. The mixture immediately begins to increase in volume, sets, and then cures to yield a foamed product of approximately 57 pounds per cubic foot.

EXAMPLE III

50 Grams of the unsaturated polyester resin syrup described in Example I is combined with 50 grams of calcium carbonate (minus 325 mesh U.S. standard screen) and 0.5 gram benzoyl peroxide powder to form component 1. 25 Grams of a 50% by weight aluminum hydroxie chloride solution is combined with 25 grams of aluminum trihydrate (minus 325 mesh U.S. standard screen) to form component 2. Components 1 and 2 are stirred in a beaker, mixed and poured onto a plastic sheet, the material immediately begins to increase in volume, sets and then cures to yield a foamed product of approximately 65 pounds per cubic foot.

EXAMPLE IV

Example II is repeated except that 30 grams of the aluminum hydroxie chloride solution is used in component 2. Components 1 and 2 are stirred together in a beaker to form an intimate mixture poured onto a plastic sheet, the material increases in volume, sets and then cures to yield a foamed product of approximately 35–40 pounds per cubic foot.

EXAMPLE V

Example III is repeated except that 5 grams of sodium bicarbonate is added to component 1. Components 1 and 2 are stirred together and poured onto a plastic sheet. The material rapidly increases in volume, sets and then cures to yield foamed product of approximately 25 pounds per cubic foot.

EXAMPLE VI

Example II is repeated except that 50 grams of magnesium carbonate is substituted for the calcium carbonate. Components 1 and 2 are stirred together in a beaker and poured onto a plastic sheet. The material immediately begins to increase in volume, sets and then cures to yield a foamed product of approximately 55 pounds per cubic foot.

EXAMPLE VII

Example III is repeated except that potassium carbonate is substituted for calcium carbonate. Components 1 and 2 are stirred together and poured onto a plastic sheet. The material immediately beging to increase in volume, sets and cures to yield a foamed product of approximately 32 pounds per cubic foot.

Two Component Systems

The highly extended unsaturated polyester resin products are especially attractive because of the useful fire resistance and strength which can be achieved at low cost. The useful storage life of of the ingredients in the original compositions is limited. In order to obtain a highly extended resin component, the dispersed particles preferably are relatively large particle size to assure essentially complete surface wetting of the particles with the resin. However, the relatively large particle size fillers tend to settle as a hard sediment in the resinous component. Similarly the fillers in the aluminum hydroxie chloride component must be of relatively large particle size and consequently tend to settle as a hard sediment in a brief period of time. For this reason, the components must be prepared at about the same time that the components will be mixed to form the composition mixture and hence the products of this invention.

I have discovered a storageable, easily mixed, two component system which takes advantage of the benefits of the present compositions and products and yet retains substantial storage life and can be employed by operators having limited mixing equipment. According to this further improvement, one component, the resin-containing component, includes unsaturated polyester resin syrup and finely divided particulate inorganic carbonate or bicarbonate of fine particle size, preferably less than about 3 microns. The finely divided inorganic carbonate or bicarbonate is milled into the unsaturated polyester resin syrup in conventional milling equipment which is similar to that employed in the paint industry. The resin-containing component also includes activators for polymerizing the unsaturated polyester resin syrup, for example, dimethylamine, diethylamine, phenylethanolamine, phenylethylethanolamine and other promoters which are well known in the unsaturated polyester resin art.

The other component, the inorganic component, includes aluminum hydroxie chloride and finely divided non-reactive extender, such as hydrated alumina, preferably having a particle size in the range of about 3 to 6 microns. The aluminum hydroxie chloride component also includes suitable surfactants and may include the catalyst such as benzoyl peroxide for curing the unsaturated polyester resin syrup.

The standard commercially available inorganic carbonate has a particle size in the range of about 10 to 30 microns whereas the inorganic carbonate required in the present two component mixture preferably has a particle size of about 3 microns.

The standard commercially available hydrated alumina has a particle size of minus-325 mesh whereas the present two component system preferably employs hydrated alumina filler having a particle size of about 3 to 6 microns.

The weight ratio of the inorganic carbonate or bicarbonate plus aluminum hydroxie chloride plus hydrated alumina to the unpolymerized unsaturated polyester resin syrup for the two component mixture is in the range of about 0.5:1 to 2:1. Thus the unsaturated polyester resin syrup content of the composition and the product is from about 33 to 67 percent by weight.

An unexpected feature of this two component system is that it can be formulated, stored, transported and stored for extended periods of time without deterioration. The operator merely mixes the proper amount of the resin-containing component with the proper amount of the inorganic component and obtains useful products, particularly where the composition mixture is employed with glass fibers in spray-up operations. The composition mixture can be formed by blending separate streams of the resin-containing component and the other component at regulated flow rates and directing the resulting mixture from an appropriate spray nozzle onto a glass fiber mat or onto a stream of chopped glass fibers produced in a familiar chopper which is commonplace in the reinforced plastics industry. The composition mixture wets the glass fibers and forms a foamed matrix which confines the randomly oriented glass fibers to produce strong, lightweight, relatively low cost glass fiber reinforced products. No rollout of the mixture is required. The reinforcing glass fibers comprise from about 5 to 35 weight percent of the reinforced product. Such products are especially useful in the manufacture of containers for fluids such as tubs and shower stalls and for outdoor containers such as swimming pools.

EXAMPLE VIII

The two-component system was prepared and evaluated in the manufacture of combined tub and shower stall units.

Component A, the resin containing component, included:

249 pounds Unsaturated polyester resin, COREZ 125-12, obtained from Interplastics Corporation of Minneapolis, Minn.—a general purpose resin having styrene as the compolymerizable monomer.

150 pounds Calcium carbonate, Number 10, white, obtained from Georgia Marble, Tate, Ga., having a particle size of about 10 microns.

The two ingredients were milled and presented at 3/20 Brookfield Viscosimeter, a viscosity of 1,200 cps and a thixotropic ratio of 3.

Component B, the other component, included:

201 pounds aluminum hydroxie chloride;

2 pounds CO-30, a surfactant obtained from Emery Chemical Corporation;

2 pounds CO-200/50, a surfactant obtained from Emery Chemical Corporation;

6 pounds T-DET-N-9.5, a surfactant obtained from Thompson Hayward Chemical Company, Kansas City, Kans.;

18 pounds CADOX 40-E, a benzoyl peroxide catalyst obtained from Noury Chemical Company of Burt, N.Y., containing about 40 weight percent benzoyl peroxide in a liquid extender.

The ingredients of Component B were allowed to rest overnight after mixing to permit degassing to occur.

Component A and Component B are mixed at a ratio of 2 parts by weight Component A to 1 part by weight Component B. The mixing occurs in a Binks formulator which mixes the two ingredients in the desired ratio and directs a spray of the mixture to a stream of chopped glass fibers from an associated glass fiber chopper. The glass fibers and composition mixture were employed to produce combined tub and shower stall units. The units were prepared by applying to a standard mold a suitable gel coat about 18-20 mils thick. Thereafter a standard unsaturated polyester resin syrup and chopped glass fibers was applied to the cured gel coat to a thickness of about 20-40 mils. Thereafter the present composition mixture along with glass fibers was applied to the cured polyester resin/glass fibers layer to an initial thickness of about 90 mils. The final, cured thickness of the foamed product was about 125-130 mils. The combined tub and shower stall units were tested and approved for use in residential plumbing installations.

Although the invention has been described with preferred embodiments, it is to be understood that variations and modifications may be resorted to as will be apparent to those skilled in this art. Such variations and modifications are to be considered within the scope of the following claims.

I claim:

1. A foamed, low density, highly extended, polymerized unsaturated polyester resin syrup product comprising:
   (a) polymerized unsaturated polyester resin syrup; and
   (b) the reaction product of aqueous aluminum hydroxie chloride solution and reactive, non-reinforcing, extender material capable of providing a blowing agent which is selected from the group consisting of inorganic carbonate compounds, inorganic bicarbonate compounds and mixtures thereof, wherein the original weight ratio of the sum of the reactive, non-reinforcing, extender material and the aqueous aluminum hydroxie chloride solution to the unsaturated polyester resin syrup is from about 0.5:1.0 to about 10.0:1.0 and the original weight ratio of the reactive, non-reinforcing, extender material to the aqueous aluminum hydroxie chloride solution is less than about 5.0:1.0.

2. The product of claim 1 wherein the composition includes a non-reactive, non-reinforcing extender material and wherein the original weight ratio of the sum of (i) the reactive, non-reinforcing extender material, (ii) the non-reactive, non-reinforcing, extender material, and (iii) the aqueous aluminum hydroxie chloride solution to the unsaturated polyester resin syrup is from about 0.5:1.0 to about 10.0:1.0 and the original weight ratio of the sum of the reactive, non-reinforcing, extender material and the non-reactive, non-reinforcing, extender material to the aqueous aluminum hydroxie chloride solution is less than about 5.0:1.0.

3. The product of claim 2 wherein the original weight ratio of the sum of (i) the reactive, non-reinforcing extender, (ii) the non-reactive, non-reinforcing, extender material, and (iii) the aqueous aluminum hydroxie chloride solution to the unsaturated polyester resin syrup is from about 0.5:1.0 to about 5.0:1.0 and the original weight ratio of the sum of the reactive, non-reinforcing, extender material and the non-reactive, non-reinforcing, extender material to the aqueous aluminum hydroxie chloride solution is from about 3.0:1.0 to about 1.0:1.0.

4. The product of claim 3 wherein the non-reactive, non-reinforcing, extender material is aluminum trihydrate.

5. The product of claim 1 including from about 5 to about 25%, by total weight, of a reinforcing filler material.

6. The product of claim 5 wherein the reinforcing filler material comprises glass fibers.

7. The product of claim 6 wherein the reactive, non-reinforcing, extender material is selected from the group consisting of carbonate compounds of Groups IA metals, carbonate compounds of Group IIA metals, bicarbonate compounds of Group IA metals, bicarbonate compounds of Group IIA metals and mixtures thereof.

8. The product of claim 1 wherein the reactive, non-reinforcing, extender material is selected from the group consisting of carbonate compounds of Group IA metals, carbonate compounds of Group IIA metals, bicarbonate compounds of Group IA metals, bicarbonate compounds of Group IIA metals and mixtures thereof.

9. A shaped article comprised of the foamed, low density, highly extended, polymerized unsaturated polyester resin syrup product of claim 1.

10. A shaped article comprised of the foamed, low density, highly extended, polymerized unsaturated polyester resin syrup product of claim 2.

11. A highly extended, unsaturated polyester resin syrup composition mixture capable of forming a foamed, low density, highly extended, polymerized unsaturated polyester resin syrup product, said composition mixture comprising:
   (a) unsaturated polyester resin syrup;
   (b) aqueous aluminum hydroxie chloride solution; and
   (c) reactive, non-reinforcing, extender material capable of providing a blowing agent which is selected from the group consisting of inorganic carbonate compounds, inorganic bicarbonate compounds and mixtures thereof, wherein the original weight ratio of the sum of the reactive, non-reinforcing, extender material and the aqueous aluminum hydroxie chloride solution to the unsaturated polyester resin syrup is from about 0.5:1.0 to about 10.0:1.0 and the original weight ratio of the reactive, non-reinforcing, extender material to the aqueous aluminum hydroxie chloride solution is less than about 5.0:1.0.

12. The composition mixture of claim 11 including a non-reactive, non-reinforcing, extender material and wherein the original weight ratio of the sum of (i) the reactive, non-reinforcing extender material, (ii) the non-reactive, non-reinforcing, extender material, and (iii) the aqueous aluminum hydroxie chloride solution to the unsaturated polyester resin syrup is from about 0.5:1.0 to about 10.0:1.0 and the original weight ratio of the sum of the reactive, non-reinforcing, extender material and the non-reactive, non-reinforcing, extender material to the aqueous aluminum hydroxie chloride solution is less than about 5.0:1.0.

13. The composition mixture of claim 12 including from about 5 to about 25%, by total weight of a reinforcing filler material.

14. The composition mixture of claim 13 wherein the reactive, non-reinforcing extender material is selected from the group consisting of carbonate compounds of Group IA metals, carbonate compounds of Group IIA metals, bicarbonate compounds of Group IA metals, bicarbonate compounds of Group IIA metals and mixtures thereof.

15. The composition mixture of claim 14 wherein the reactive, non-reinforcing, extender material is selected from the group consisting of sodium carbonate, potassium carbonate, magnesium carbonate, calcium carbonate, sodium bicarbonate, potassium bicarbonate, calcium bicarbonate, magnesium bicarbonate and mixtures thereof.

16. A highly extended, unsaturated polyester resin syrup composition mixture capable of forming a foamed, low density, highly extended, polymerized unsaturated polyester resin syrup product, said composition mixture comprising:
 (a) from about 12 to about 33 parts by weight of unsaturated polyester resin syrup;
 (b) from about 4 to about 30 parts by weight of aqueous aluminum hydroxie chloride solution; and
 (c) from about 15 to about 50 parts by weight of reactive non-reinforcing, extender material capable of providing a blowing agent which is selected from the group consisting of inorganic carbonate compounds, inorganic bicarbonate compounds and mixtures thereof.

17. The composition mixture of claim 16 including from about 15 to about 50%, by weight, of non-reactive, non-reinforcing, extender material.

18. The composition mixture of claim 17 comprising:
 (a) from about 15 to about 30 parts by weight of unsaturated polyester resin syrup;
 (b) from about 5 to about 15 parts by weight of aqueous aluminum hydroxie chloride solution;
 (c) from about 20 to about 50 parts by weight of reactive non-reinforcing, extender material capable of providing a blowing agent which is selected from the group consisting of inorganic compound, inorganic bicarbonate compounds and mixtures thereof; and
 (d) from about 20 to about 50%, by weight, of non-reactive, non-reinforcing, extender material.

19. The composition mixture of claim 18 including from about 5 to about 25%, by total weight, of a reinforcing filler material.

20. The composition mixture of claim 19 wherein the reinforcing filler material comprises glass fibers.

21. The composition mixture of claim 20 wherein the reactive, non-reinforcing, extender material selected from the group consisting of carbonate compounds of Group IA metals, carbonate compounds of Group IIA metals, bicarbonate compounds of Group IA metals, bicarbonate compounds of Group IIA metals and mixtures thereof.

22. A process for preparing a shaped article comprising:
 (a) preparing a first component comprising
   (i) unsaturated polyester resin syrup, and
   (ii) reactive, non-reinforcing, extender material capable of providing a blowing agent which is selected from the group consisting of inorganic carbonate compounds, inorganic bicarbonate compounds and mixtures thereof;
 (b) preparing a second component comprising
   (i) an aqueous solution containing from about 25 to about 65%, by weight, of aluminum hydroxie chloride.
 (c) mixing the first and second component to form a composition mixture;
 (d) shaping the composition mixture into the configuration of the article; and
 (e) curing the composition mixture to form a foamed, low density, highly extended, polymerized unsaturated polyester resin syrup product,
wherein the composition mixture has an original weight ratio of the sum of the reactive, non-reinforcing, extender material and the aqueous aluminum hydroxie chloride solution to the unsaturated polyester resin syrup of from about 0.5:1.0 to about 10.0:1.0 and an original weight ratio of the reactive, non-reinforcing, extender material to the aqueous aluminum hydroxie chloride solution of less than about 5.0:1.0.

23. The process of claim 22 wherein at least the second component includes non-reactive, non-reinforcing, extender material whereby the composition mixture has an original weight ratio of the sum of (i) the non-reactive, non-reinforcing, extender material, (ii) the non-reactive, non-reinforcing, extender material, and (iii) the aqueous aluminum hydroxie chloride solution to the unsaturated polyester resin syrup is from about 0.5:1.0 to about 10.0:1.0 and the original weight ratio of the sum of the reactive, non-reinforcing, extender material and the non-reactive, non-reinforcing, extender material to the aqueous aluminum hydroxie chloride solution is less than about 5.0:1.0.

24. The process of claim 23 wherein the composition mixture includes from about 5 to about 25%, by total weight, of a reinforcing filler material.

25. The process of claim 24 wherein the reinforcing filler material comprises glass fibers.

26. The process of claim 24 wherein the viscosities of the first and second components are approximately equal.

27. The process of claim 24 wherein the original weight ratio of the sum of (i) the reactive, non-reinforcing extender material, (ii) the non-reactive, non-reinforcing, extender material, and (iii) the aqueous aluminum hydroxie chloride solution to the unsaturated polyester resin syrup is from about 0.5:1.0 to about 5.0:1.0 and the original weight ratio of the sum of the reactive, non-reinforcing, extender material and the non-reactive, non-reinforcing, extender material to the aqueous aluminum hydroxie chloride solution is from about 3.0:1.0 to about 1.0:1.0.

28. The process of claim 27 wherein the reactive, non-reinforcing, extender material is selected from the group consisting of carbonate compounds of Group IA metals, carbonate compounds of Group IIA metals, bicarbonate compounds of Group IA metals, bicarbonate compounds of Group IIA metals and mixtures thereof and the non-reactive, non-reinforcing, extender material is aluminum trihydrate.

29. A two-component, storageable, easily mixed system for producing a foamed, low density, highly extended unsaturated polyester resin product comprising:
as a resin-containing component:
Unsaturated polyester resin syrup and finely divided particulate inorganic carbonate or bicarbonate; and
as the other component:
Aqueous aluminum hydroxie chloride and finely divided particulate non-reactive extender;
said unsaturated polyester resin syrup comprising from 33 to 67 percent of the weight of the two components.

30. The composition of claim 29 wherein the finely divided particulate inorganic carbonate or bicarbonate has a particle size less than 3 microns.

31. The composition of claim 29 wherein the said resin-containing component is milled together.

32. The composition of claim 29 wherein the said other component contains a catalyst for polymerization of unsaturated polyester resin syrup.

33. The composition of claim 29 wherein the said other component contains surfactant.

* * * * *